United States Patent [19]

Ferra

[11] Patent Number: 5,160,170
[45] Date of Patent: Nov. 3, 1992

[54] COMPACT COLOR-CODED FOLDING MAP

[76] Inventor: William E. Ferra, 144 N. Wetherly Dr., Ste. 201, Los Angeles, Calif. 90048

[21] Appl. No.: 778,671
[22] Filed: Oct. 18, 1991
[51] Int. Cl.⁵ .............................................. G09B 29/00
[52] U.S. Cl. .................................... 283/35; 283/34
[58] Field of Search ................ 283/34, 35; 434/130, 434/150, 153; 40/904

[56] References Cited

U.S. PATENT DOCUMENTS

| | | |
|---|---|---|
| 3,143,363 | 4/1964 | Falk . |
| 4,289,333 | 9/1981 | Gaetano . |
| 4,801,157 | 1/1989 | Sink . |
| 4,906,024 | 3/1990 | Lein . |
| 4,968,062 | 11/1990 | Bus ........................................ 283/35 |

Primary Examiner—Timothy V. Eley
Assistant Examiner—William Fridie, Jr.

[57] ABSTRACT

A map folded into a small handy package is arranged to be unfold in different sized section showing areas of interest around a specific location, a hotel or a motel, etc., with each section enlarging the map area radiating out from the specific location. Colored edge strips make finding map areas easy and provide a color aligning of edges to prevent improper folding the map from fully unfolded back to a small handy package.

3 Claims, 3 Drawing Sheets

COMPACT COLOR-CODED FOLDING MAP

BACKGROUND OF THE INVENTION

1. Field of the Invention

This invention relates to road and area maps designed to illuminate specific positions of interest in the immediate vicinity of a particular location. The present invention is specially directed towards a map which folds into a compact package and as unfolded enlarges the scope of information directed outward from a given point. The present invention also provides an easy-to-follow fold path which helps prevent improper folding of the map back to an origin compact package.

2. Description of the Prior Art

Although many types of folding maps are available in the market place and seen in past art patents, the unique area enlargement features and the folding guide provided in the immediate invention are not seen either in the market place or in the past art patents examined.

A sampling of folding maps from a past-art patent search would include (1) the patent issued to G. Falk on Aug. 4, 1964, U.S. Pat. No. 3,143,363, which shows a method of folding a large map into a book form. (2) The Gaetano patent dated Sept. 15, 1981, U.S. Pat. No. 4,289,333, showing a "Method for Locating Features on a Map." (3) The folding map shown in U.S. Pat. No. 4,801,157, issued to Sink on Jan. 31, 1989, illustrating folding a single sheet in according fashion. Also there is a "Foldable Sheet" patent granted to Lein on Mar. 6, 1990, U.S. Pat. No. 4,906,024, which describes folding a rectangular sheet by a plurality of intersecting folding edges.

The foregoing seems typical of folding maps and methods of folding various sheet forms. It is noted that any color coding used was for locating areas and not for aligning the map edges for folding. It is also noted the areas exposed by unfolding the past art maps are not directed outward from a particular location.

SUMMARY OF THE INVENTION

Therefore, in practicing my invention, I provide, in the present invention, a unique area-of-interest map which can be folded into a small and handy package. The folds are arranged to unfold showing first a small area around a specific location, a hotel or a motel, etc., and designating points of interest close to the original location. As the map is further unfolded the areas of interest are enlarged. Multiples of my map can be made available as ordered for specific areas in the various U.S. states, cities, towns, etc., and can be provided for foreign countries. The map or maps according to the invention are designed as a service give-away for hotels, motels, Chambers of Commerce and the like to allow visitors information on local points of interest close to where they are staying. The maps have color-coded edges to further enhance understanding the different areas covered by a particular map and to prevent incorrect refolding.

Therefore, a principal object of the present invention is to provide an area-of-interest map in a small and handy package that can be unfold showing increasing larger features surrounding a particular location as the map is unfolded.

Another object of the invention is to provide a map with color-coded edging to further enhance understanding of different areas covered by a particular map and to prevent incorrect folding.

A further object of my invention is to provide a map particularly designed as a service give-away for hotels, motels, Chambers of Commerce and the like to allow visitors information on local points of interest close to where they are staying Other objects and the many advantages of the present invention will become clear from reading the specification and comparing numerically designated parts described relative to the same numbered parts illustrated in the drawings.

BRIEF DESCRIPTION OF THE DRAWINGS

The unique folding and color coding of the map is illustrated in the included drawings in which.

DESCRIPTION OF THE PREFERRED EMBODIMENTS

Figure 1:
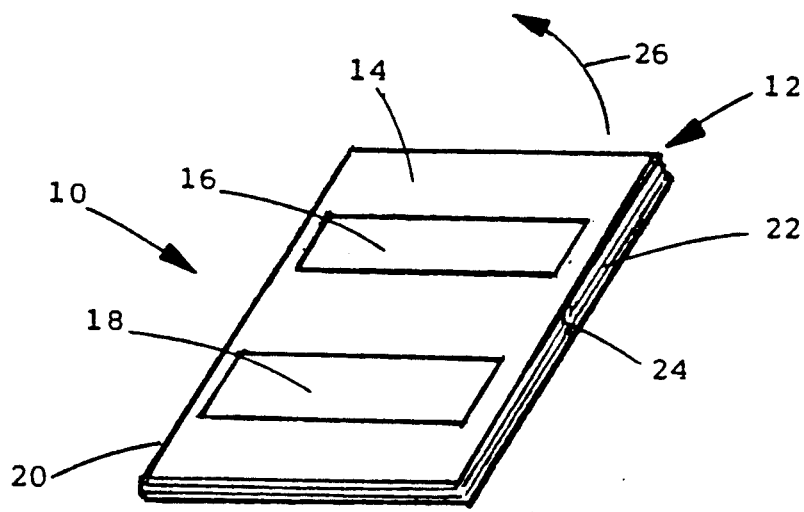
FIG. 1 shows the map completely folded into a small package with a covering. Space is provided on the covering for a trade name and company add.

Referring now to the drawings at FIG. 1 where map 10, according to the invention, is illustrated folded for easy carrying into a small booklet-like package 12. On the surface of front cover 14 of folded map 10 are illustrative advertising and map information display areas, upper display area 16 and lower display area 18. To the left in the FIG. 1 illustration is the book fold edge 20. On the right side, accordion folds 22 which can be opened out along center fold opening 24 can be seen. A directional arrow 26 shows the direction of unfolding to expose a first map area 28, FIG. 2, of map 10.

Figure 2:
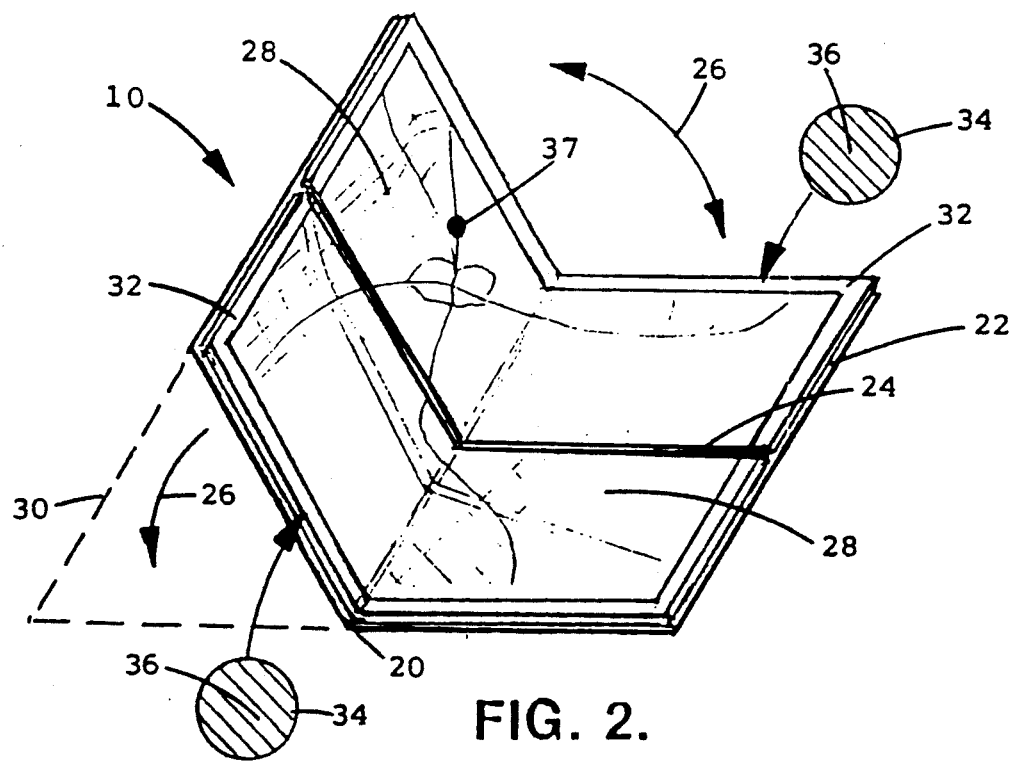
FIG. 2 shows how the map according to the invention is unfolded.

FIG. 2 shows how map 10 is first unfolded along the book fold edge 20. In the illustration at FIG. 2, map 10 is in a near first unfolded position 30. A first map viewing area 28 is being exposed. As map 10 is unfolded the first of the color-coded outer edge strips 32 can be seen. The outer edge strip 32 in FIG. 2 is peripheral to first map viewing area 28. The circled color symbol reference 34 in FIG. 2 indicates that the first edge strip 32 is the color green 36. A particular location 37, a hotel, a motel, etc., where map 10 was supplied is plainly identified on first map viewing area 28 and first map viewing area 28 is useful to show visitors points of interest in the immediate vicinity of the location they are staying at. It is also useful for visitors unfamiliar with the local to find their way back to their lodging place.

Figure 3:
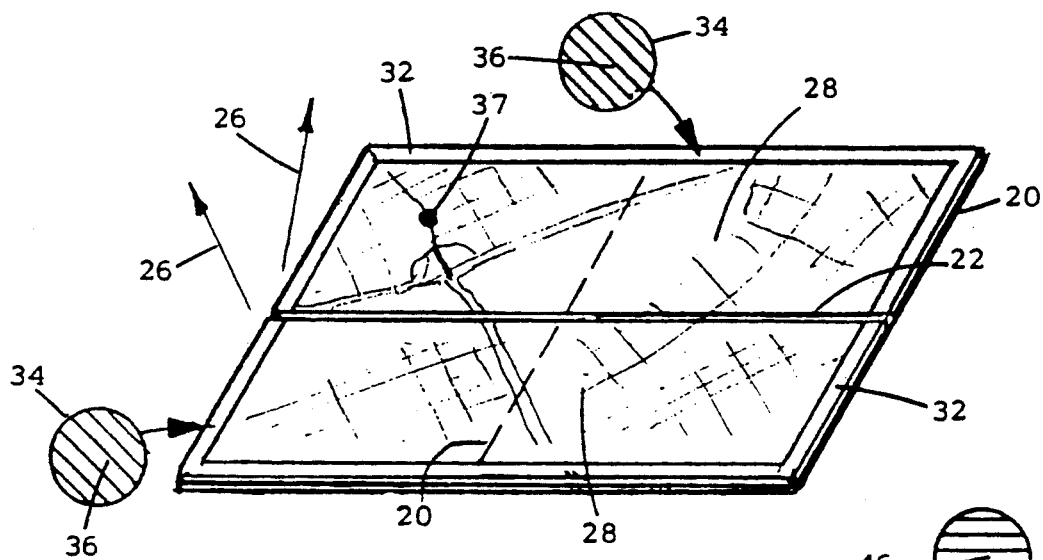
FIG. 3 shows the map unfolded in a first step allowing a visitor to view points of interest close to where he is staying. The color coding on the edge strip framing is indicated by circled symbol references with left angled lines indicating the color green.

FIG. 3 shows map 10 opened to first unfolded position 30. First map viewing area 28 is fully exposed and directional arrows 26 indicate the next sections to be unfolded and the direction of moving the accordion folds 22 to expose a second map viewing area 42, FIG. 4. The color green 36 edge strip 32 fully frames first map viewing area 28. When map 10 is opened to a different map viewing area a different colored edge strip 32 frames each different map viewing area. The different colored edge strips 32 have two functions. The first function is to indicate a particular map view area, such as first map view area 28 being framed by the color green 36. The second function is to prevent improper folding when map 10 has been fully opened and is to be folded back into small booklet-like package 12. The second function of colored edge strips 32 is further described in the continuation of this specification.

Figure 4:
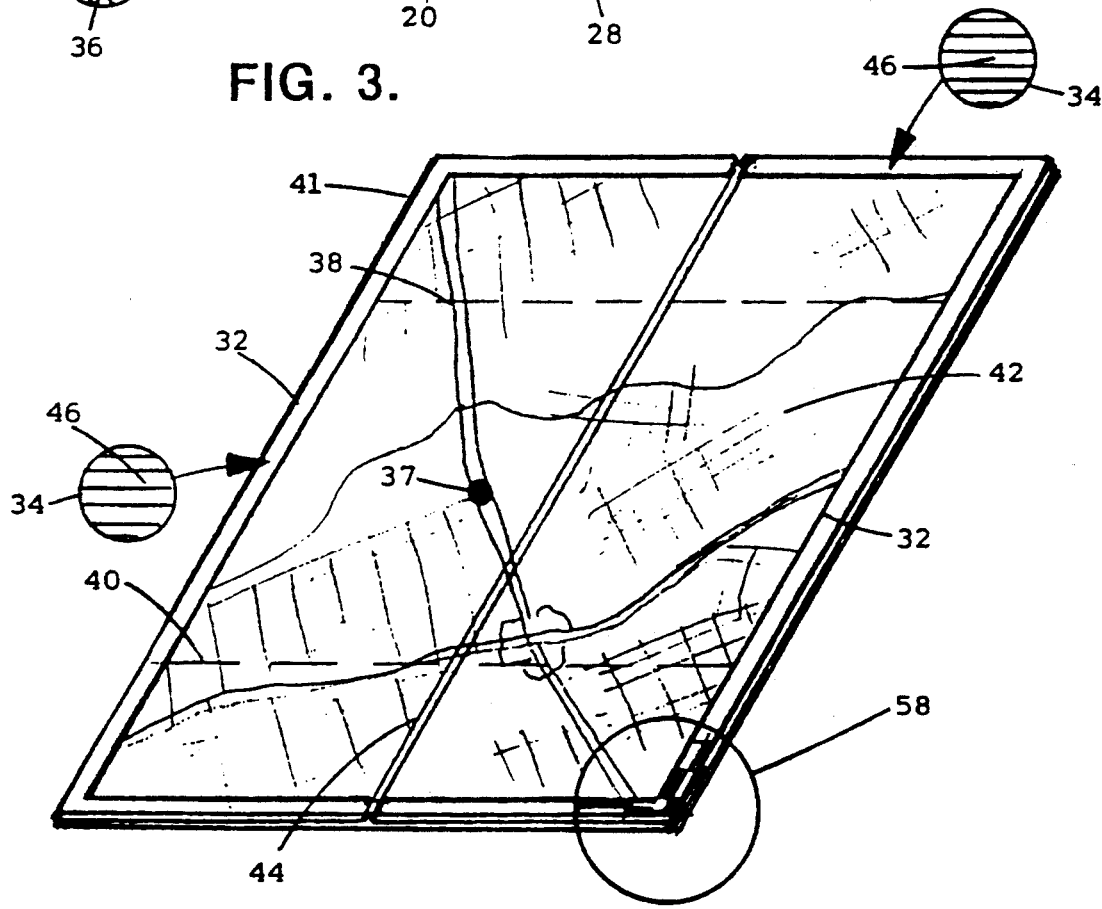
FIG. 4 shows the map of this invention further unfolded to give a visitor a larger area of interest. Color coded edges provides area designation for a particular fold of the map. The horizontal lines in the FIG. 4 circled color symbol indicates the color blue.

In FIG. 4, map 10 has been further unfolded along fold lines 38 and 40 to a second unfolded position 41. A second map viewing area 42 is now exposed and available for study. It is to be noted that second map viewing area 42 is an increased area encompassing first map viewing area 28 and radiating out still further from a particular location 37. Color-coded outer edge strip 32 is now the color blue 46 as indicated by circled color symbol reference 34.

Figure 5:
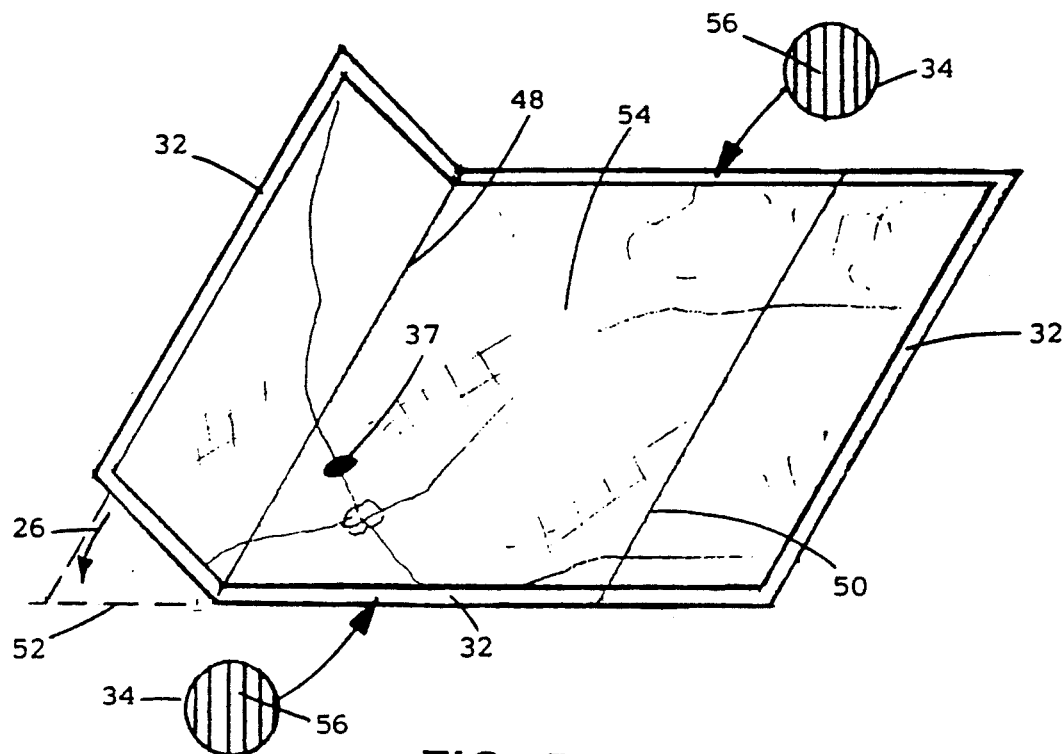
FIG. 5 shows the map fully opened for covering an extensive area surrounding a particular location. The circled color symbol with vertical lines indicates the color red.

In FIG. 5, map 10 is being further unfolded along fold lines 48 and 50 to an increased third unfolded position 52 to make third map viewing area 54, a still further enlargement of the area radiating out from particular location 37 available. Color-coded outer edge strip 32 is the color blue 56.

Figure 6:
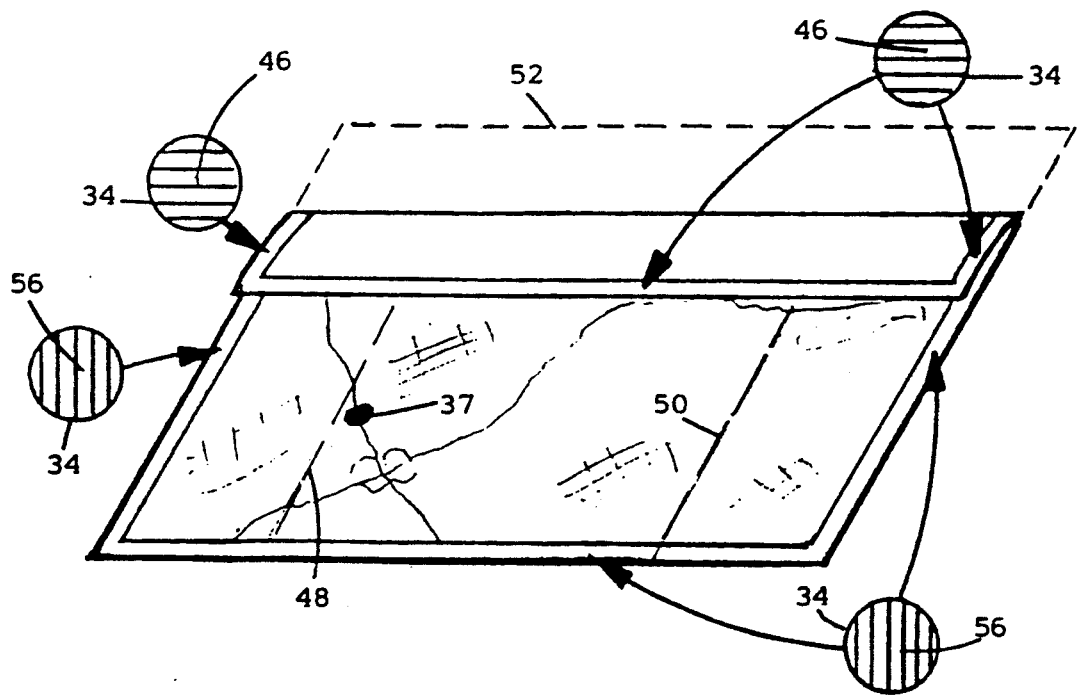
FIG. 6 shows what would happen if the fully opened map of FIG. 5 were to be refolded incorrectly. The color coded edge strips would not match instantly alerting the person folding the map the it is being done wrong.

Map 10 can be fully unfolded as shown in FIG. 5 and refolded back to small booklet-like package 12 for convenient carrying, for storage, or display as shown in FIG. 1. Map 10 is easy to refold because color-coded edge strips 32 will align with the same edge colors when map 10 is folded correctly. In FIG. 6, an illustration of what happens if map 10 is improperly folded is shown. The color on the edge strip 32 on the back side of map 10 being blue 46 would be obviously different from the edge strip 32 color blue 56 on the opened upwardly faced map 10. This color coding makes locating desired map sections easy and offers guidelines for refolding map 10 into small booklet-like package 12 without difficulty. To provide map 10 useful to color blinded persons, strip 32 could include designs 58 partially illustrated in a corner section of FIG. 4.

Although I have described embodiments of my invention with considerable detail in the foregoing specification and have illustrated them extensively in the drawings, it is to be understood that I may practice variations in the invention which do not exceed the scope of the appended claims. Also, I shall consider my invention variations practiced by others which fall within my claim scope.

What is claimed is:

1. A compact color-coded folding map comprising in combination:
   (a) a one-piece map displaying encompassing local around a specific location;
   (b) visible lines on said map as fold indicators for folding said map in successive stages from said one-piece into a small booklet-like package;
   (c) colored edge strips each of a particular color arranged to frame each said successive folded stage of said map, said strips framing each folded stage with a single color, each said successive folded stage framed with a different color;
   (d) said map when folded into said small booklet-like package having plain cover areas provided for informational printing thereof;
   (e) said map when unfolded in said successive stages, each stage displaying successively increased enlargements expanding the scope of said map relative to said specific location;
   (f) said colored edge strips being a particular color for each said successive map fold stage providing locational information for each said successive map fold stage and being color-coded guidelines additional to said visible lines for refolding said map from said one-piece map back to said small booklet-like package.

2. The compact color-coded folding map of claim 1 and limitations thereof wherein said map is not restricted to a particular local.

3. The compact color-coded folding map of claim 1 and limitations thereof wherein said edge strips include a particular design with each said successive fold stage having a differently designed edge strip, each design particular to a particular said fold stage.

* * * * *